Figure 1:
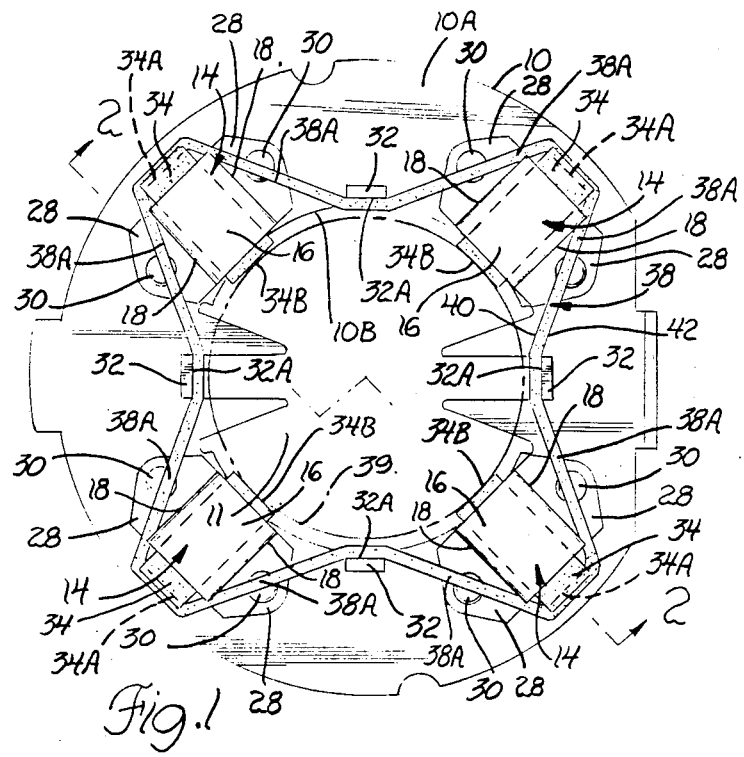

United States Patent [19]

Mummert

[11] Patent Number: 4,785,214
[45] Date of Patent: Nov. 15, 1988

[54] BRUSH RIGGING FOR DYNAMOELECTRIC MACHINES

[75] Inventor: Jeffrey L. Mummert, Anderson, Ind.

[73] Assignee: General Motors Corporation, Detroit, Mich.

[21] Appl. No.: 114,491

[22] Filed: Oct. 30, 1987

[51] Int. Cl.⁴ .......................................... H02K 13/00
[52] U.S. Cl. ................... 310/241; 310/239; 310/242; 310/245; 310/248; 439/29
[58] Field of Search ............. 310/239, 229, 240, 230, 310/241, 242, 244, 245, 246, 247, 248, 233, 45, 271; 439/11, 13, 25, 29

[56] References Cited

U.S. PATENT DOCUMENTS

| | | | |
|---|---|---|---|
| 1,509,666 | 9/1924 | Campbell | 310/245 |
| 2,179,279 | 11/1939 | Brecht | 310/245 UX |
| 2,954,492 | 9/1960 | De Voe | 310/245 |
| 3,025,421 | 3/1962 | Sievert | 310/245 |
| 3,270,306 | 8/1966 | Burski | 310/248 |
| 3,278,777 | 10/1966 | Grooms | 310/240 |

FOREIGN PATENT DOCUMENTS

| | | | |
|---|---|---|---|
| 0741538 | 11/1943 | Fed. Rep. of Germany | 310/242 |
| 0954979 | 12/1968 | Fed. Rep. of Germany | 310/239 |
| 0073547 | 4/1986 | Japan | 310/239 |
| 0028812 | 1/1968 | U.S.S.R. | 310/242 |

Primary Examiner—R. Skudy
Attorney, Agent, or Firm—C. R. Meland

[57] ABSTRACT

Brush rigging for a dynamoelectric machine such as an electric cranking motor for cranking an internal combustion engine. A support carries a plurality of radially extending brush holders each of which slidably supports a brush. The brushes are urged radially inwardly by an elastomeric band that is formed of electrical insulating material. The band directly engages the outer ends of the brushes and a plurality of pins that are carried by the support. The pins are located between pairs of brush holders.

5 Claims, 1 Drawing Sheet

U.S. Patent    Nov. 15, 1988    4,785,214

BRUSH RIGGING FOR DYNAMOELECTRIC MACHINES

This invention relates to brush rigging for dynamoelectric machines and more particularly to brush rigging wherein a one-piece endless elastomeric band is used to urge brushes into engagement with a rotary current collector such as a commutator of a dynamoelectric machine.

Brush rigging for dynamoelectric machines that utilize individual metallic springs for urging brushes radially inwardly are well known to those skilled in the art, examples being the devices disclosed in the U.S. Pat. Nos. 1,509,666 to Campbell; 2,179,279 Brecht and 3,025,421 Sievert. It is also known to provide an endless metallic coil spring for urging brushes against a commutator as is disclosed in the U.S. patent to deVoe et al. U.S. Pat. No. 2,954,492.

This invention differs from the above-referenced patents in that, among other things, it utilizes a one-piece elastomer band to force the brushes radially inwardly. The band is formed of an elastomeric electrical insulating material so that additional insulators, like those used in the deVoe et al. patent, are not required in order to electrically insulate one brush from another.

It accordingly is an object of this invention to provide brush rigging for a dynamoelectric machine wherein a one-piece endless elastomeric band that is formed of electrical insulating material directly engages the outer ends of a plurality of brushes to force the brushes radially inwardly.

Another object of this invention is to provide brush rigging of the type described wherein the elastomeric band engages the brushes and engages a plurality of pins that are respectively located between pairs of brushes. The pins are supported by a plate member that is adapted to be secured to an end frame of a dynamoelectric machine.

IN THE DRAWINGS

Figure 2:
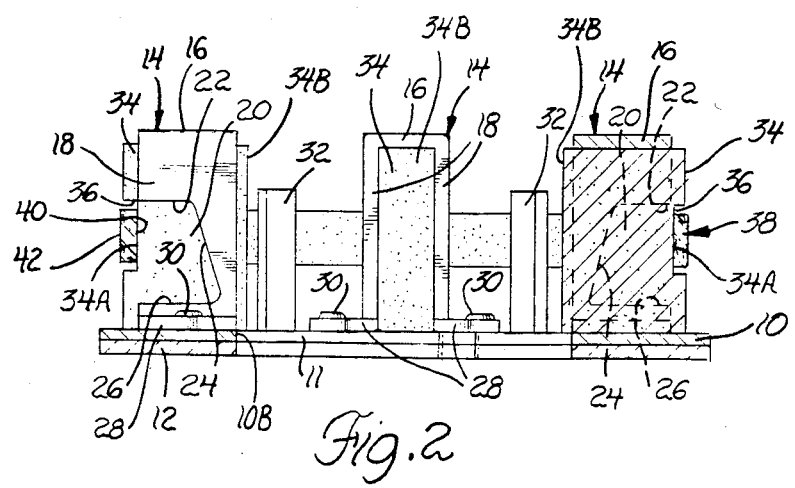

FIG. 1 is plan view of brush rigging apparatus made in accordance with this invention; and FIG. 2 is a view partly in section taken along line 2—2 of FIG. 1.

Referring now to the drawings, the reference numeral 10 designates a support that takes the form of an annular metallic plate having a central opening 11 defined by circular wall 10B. An annular insulator member designated by reference numeral 12, which is formed of insulating material, is secured to the plate 10. The plate 10 carries four brush holders, each of which have been designated by reference numeral 14. The brush holders 14 are U-shaped and are formed of a metallic material. These brush holders are identical and accordingly only one of them will be described in detail. Each brush holder 14 has a top wall 16 and a pair of side walls 18. Each side wall 18 is provided with a recess or slot 20 defined by surfaces 22, 24 and 26. The surface 24 is slanted to allow brush leads or connectors that are connected to respective brushes (not illustrated) to pass through a portion of the slot 20. Each of the brush holders 14 has flange portions 28 which engage and are secured to the plate 10 by suitable fasteners such as the rivets 30. The rivets 30 can also serve to fasten insulator 12 to plate 10. The plate 10 carries four axially extending pins 32 which are respectively located between two brush holders. The pins 32 can be integral with the plate 10.

Each of the brush holders 14 and portions of the surface 10A of plate 10 slidably support a brush 34 for radial movement. Putting it another way, inner surfaces of walls 16 and 18 and portions of surface 10A that contact the brushes slidably support the brushes. The brushes 34 have rectangular slots 36 which are illustrated in FIG. 2. It can be seen that the brush holders are located such that the brushes can move radially along radial axes that would intersect an imaginary point located at the center of circular wall 10B. When the brushes engage a commutator their radial axes would intersect the longitudinal axis of the commutator.

The brushes 34 are urged or forced radially inwardly by a one-piece endless elastomeric band which has been designated by reference numeral 38. The band 38 has a rectangular cross section and has an inner surface 40 and an outer surface 42.

Portions of the inner surface 40 of the band 38 directly engage surfaces 34A of brushes 34. Portions of the outer surface 42 of band 38 engage surfaces 32A of the pins The pins 32 are located closely adjacent the wall 10B and are positioned such that portions 38A of the band 38 make a small angle with a side of a brush.

The elastomeric band 38 is formed of an elastic or rubber-like material that is an electrical insulating material. Since the band 38 directly engages the brushes 34 and since brushes 34 may generate substantial heat during use, due to current passing through the brushes, the material of band 38 should be heat resistant. In regard to heat generation, it should be noted that the brush rigging of this invention can be used on electric cranking or starting motors for cranking an internal combustion engine and in such use high currents are carried by the brushes. To provide a good heat resistance the band 38 may be formed of a silicone rubber material. Silicone rubber materials can withstand 500° F. and remain flexible at temperatures of −100° F. This material retains its electrical insulating property even when subjected to extreme heat. Further, this material is resistant to oxidation and ozone.

In FIG. 1, the elastomeric band 38 is shown in an assembled stretched position that is where it has been stretched from an initial unstretched condition and where it engages the brushes and pins. The brushes in FIG. 1 have been shown in a position in which the brushes have not been used or worn down. In the position of the brushes shown in FIG. 1, the end surfaces 34B of the brushes would engage the outer periphery of a commutator which is represented by phantom line 39. As the brushes wear down the elastomeric band 38 contracts and continues to force the brushes against the commutator. As the end surfaces 34B of brushes 34 wear down the portions of the band 38 that engage the brushes move radially inwardly and these portions can move into the slots or recesses 20 of the brush holders 14.

In use the plate 10 and insulator 12 are adapted to be secured to the end frame of a dynamoelectric machine and the end surfaces 34B of the brushes contact the commutator of the armature. The dynamoelectric machine may be, for example, an electric cranking motor for cranking an internal combustion engine.

It should be noted that the pins 32 are located radially inwardly of brush surfaces 34A and as can be seen in FIG. 1 are located adjacent wall 10B of plate 10. The pins 32 must be located so that there is clearance between the inner surface 40 of band 38 and the commutator. The pins 32 should be located radially inwardly as far as possible in relation to brush surfaces 34A so that the band 38 will apply sufficient force to the brushes to maintain good contact between the brushes and the commutator as the brushes wear down. It will be appreciated that as the brushes do wear down the band 38 will change in both length and in force direction. The forces at the beginning and the end of brush wear can be designed to be in the range required.

In regard to the force applied to a brush by portions 38A of band 38, these portions exert a non-radial force to a brush. The force vectors perpendicular to the radial axis of a brush cancel each other and leave only the radial component of the force. In regard to force vectors, it is desirable that the pins 32 be located as far as possible radially inwardly since the axial force applied to a brush in a radial direction will be a function of the angle between portions 38A of band 38 and a side surface of a brush. The radial inward force that the band can apply to a brush will increase as this angle decreases and this angle is determined by the radial position of a pin 32.

The embodiments, of the invention in which an exclusive property or privilege is claimed are defined as follows:

1. A brush rigging for a dynamoelectric machine comprising, a support, a plurality of circumferentially spaced and radially extending brush holders carried by said support a brush slidably supported by each brush holder, each brush holder being positioned to guide a respective brush for movement radially inwardly, a plurality of pins carried by said support, and an endless elastomeric band formed of electrical insulating material having inner surface portions directly engaging outer surface portions of said brushes and outer surface portions engaging said pins, said pins being located radially inwardly of the outer surface portions of said brushes that are engaged by said band, said band forcing said brushes radially inwardly.

2. The brush rigging according to claim 1 where the elastomeric band is formed of silicone rubber.

3. The brush rigging according to claim 1 where the brush holders have slots in the side walls of the brush holders to allow the band to move into the slots as the brushes wear down.

4. The brush rigging according to claim 1 where the support has a central opening and wherein the pins are located adjacent an edge of the central opening.

5. The brush rigging according to claim 1 where four brush holders are carried by the support and where four pins are provided, the pins being located respectively between a pair of brush holders.

* * * * *